(12) United States Patent
Vietti et al.

(10) Patent No.: US 6,383,324 B1
(45) Date of Patent: May 7, 2002

(54) POLYSULFIDE-BASED POLYURETHANE SEALANT FOR INSULATING GLASS

(75) Inventors: David E. Vietti, Cary; Stephen J. Hobbs, Woodstock; Keith B. Potts, Elgin; Arlene C. Hanson, Wonder Lake, all of IL (US)

(73) Assignee: Morton International, Inc., Chicago, IL (US)

( * ) Notice: Subject to any disclaimer, the term of this patent is extended or adjusted under 35 U.S.C. 154(b) by 0 days.

(21) Appl. No.: 09/448,125

(22) Filed: Nov. 24, 1999

(51) Int. Cl.[7] .............................................. B32B 17/00
(52) U.S. Cl. .................... 156/107; 156/331.4; 428/419; 528/58
(58) Field of Search ............................ 156/107, 331.4; 428/419; 528/58

(56) References Cited

U.S. PATENT DOCUMENTS

| | | |
|---|---|---|
| 2,469,404 A | 5/1949 | Patrick et al. |
| 2,518,245 A | 8/1950 | Morris et al. |
| 2,527,378 A | 10/1950 | Bertozzi et al. |
| 2,582,605 A | 1/1952 | Richter et al. |
| 2,728,748 A | 12/1955 | Davis |
| 3,141,294 A | 7/1964 | Lawrence et al. |
| 3,169,119 A * | 2/1965 | Dankert et al. |
| 3,386,963 A | 6/1968 | Santaniello |
| 3,419,533 A * | 12/1968 | Dieterich ...................... 528/58 |
| 3,852,149 A * | 12/1974 | Sitter et al. .................. 156/107 |
| 3,997,614 A | 12/1976 | Lenke et al. |
| 4,431,691 A * | 2/1984 | Greenlee .................... 156/107 |

FOREIGN PATENT DOCUMENTS

| | | |
|---|---|---|
| DE | 2024944 | 2/1971 |
| DE | 2119550 | 11/1971 |

* cited by examiner

*Primary Examiner*—John J. Gallagher
(74) *Attorney, Agent, or Firm*—Stephen T. Falk

(57) ABSTRACT

An insulated glass sealant having the best characteristics of polysulfides and polyurethanes rather than the worst is made from a polysulfide-based polyurethane prepared by a one-step procedure wherein a randomly copolymeric hydroxyl-terminated polysulfide polyacetal is reacted with a polyisocyanate at a ratio of from about 1:1 to about 1:1.2 on an equivalents basis. The copolymeric hydroxyl-terminated polysulfide polyacetal is made by the condensation of formaldehyde with a mixture of a dithiodialkylene glycol and an aliphatic or cycloaliphatic diol.

8 Claims, No Drawings

POLYSULFIDE-BASED POLYURETHANE SEALANT FOR INSULATING GLASS

FIELD OF THE INVENTION

This invention relates to an improved sealant for insulating glass windows which has a combination of the best properties of a polyurethane and a polysulfide. It further relates to a polyurethane sealant made from a hydroxyl terminated polysulfide polyformal.

The term "insulating glass window" refers to a structure comprising panes of glass, the faces of which are in spaced relationship, thereby providing a space between the panes which imparts insulating properties to the structure. In its most widely used form, 2 parallel panes are positioned in spaced relationship by metallic or organic resin spacers placed in board around the perimeter of the panes, thereby forming a U-shaped channel in which the interior faces of the pane are the legs and a side of the spacer is the base of the channel. Typically, the spacer is a hollow form filled with a water-absorbent material, such as a molecular sieve, to keep the enclosed air space dry. The U-shaped channel around the perimeter of the window is filled with a sealant which must have a combination of properties for satisfactory use. Some of those properties are as follows.

The sealant must have very low moisture vapor transmission (MVT) rate so that moisture is prevented from entering the dry space between the panes of glass. Moisture in such space tends to condense on the interior faces of the panes, creating visibility and aesthetic problems. If the sealant does not have a satisfactory MVT rate, the longevity of the insulated unit will be severely reduced.

The sealant should have good elongation and flexibility so that it "gives" during contraction and expansion of the insulated glass structure caused by temperature changes, thus relieving glass stress.

The sealant should also form an excellent bond with glass which is not degraded over long periods of use when exposed to sunlight, moisture, and large temperature changes. Tensile adhesion strength is an important indicator of bond strength.

In U.S. Pat. No. 3,386,963, Santaniello discloses certain isocyanate terminated polysulfide pre-polymers that are curable with polyols to form sealants and adhesives. The pre-polymers are made from hydroxyl terminated polysulfides having the formula:

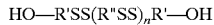

HO—R'SS(R"SS)$_n$R'—OH wherein R' and R" are the same bivalent aliphatic radical wherein the carbon chain may be interrupted by oxygen atoms and the molecular weight is from 500 to 9000. There is no teaching about the properties of polyurethanes having a polysulfide backbone when R' is polymethylene.

SUMMARY OF THE INVENTION

It is an object of this invention to provide a method for sealing insulating glass windows with rugged sealants that combine the excellent liquid polysulfide attributes of good resistance to solvents and wood preservatives, low argon migration, good resistance to free radical oxidation, and good workability with the polyurethane characteristics of low moisture vapor transmission (MVT), low water swell, good electrical resistance, and good adhesion to organic components of insulated glass windows.

It is another object of this invention to provide a sealant whose hardness is less than that of a polysulfide-based polyurethane sealant of the prior art having the same molecular weight and cross-link density.

It is a related object of this invention to provide an isocyanate-terminated polysulfide which may be used as an intermediate or precursor in the formation of the insulated glass sealant.

These and other objects which will become apparent from the following description of the invention are achieved by an insulated glass sealant comprising the condensation product of a polyisocyanate with a randomly copolymeric polyacetal of a dithiodialkylene glycol and an aliphatic diol, and, optionally, an aliphatic triol or higher function polyol as a partial replacement of the diol.

DETAILED DESCRIPTION OF THE INVENTION

The copolymeric polyacetal is formed by reaction of the diols (with or without a triol) with formaldehyde preferably as paraformaldehyde because of its lesser volatility, ready availability and low cost.

The synthesis of the copolymeric polyacetal as an intermediate for the purposes of this invention is basically a one-step procedure in which all of the reaction components and an acidic catalyst such as toluene sulfonic acid or an acidic ion exchange resin such as AMBERLITE IR 120 are charged to a reactor vessel and heated to a temperature of from about 60 to about 100° C. or higher. The maximum reaction temperature is limited only by the volatility and/or thermal stability of the reactants and products, whichever may be controlling. A solvent such as toluene may be used to help strip the water of condensation from the reaction mixture. When little or no more water is evolved from the reaction mixture, the reaction may be stopped or more aldehyde may be added in order to drive the molecular weight up. The reaction mixture is then cooled and neutralized with a base such as ammonium hydroxide, calcium hydroxide, or potassium carbonate and filtered. The solvent is removed by distillation and the reaction product may be stripped further under vacuum to remove unreacted glycols, other diols, and triols. The polyacetal has a number average molecular weight of from about 500 to about 10,000, preferably from about 1500 to about 4500.

The dithiodialkylene glycols are prepared by the method taught in U.S. Pat. No. 2,527,378, which also is incorporated herein by reference. The alkylene groups of the dithiodialkylene glycols contain from 2 to 20 carbon atoms. Dithiodiethyleneglycol, the simplest of all and often called dithiodiglycol, is preferred but other examples include the propylene, butylene, hexylene, and other linear homologs, as well as those in which the alkylene groups are branched. Alternatively, dithiodialkyleneglycols may be made by oxidation of mercaptoalcohols.

The following dihydroxy compounds are suitable as co-monomers for conversion to polyacetals in accordance with this invention:

(1) alkane diols having a chain length of from 2 to 20 carbon atoms, inclusive, such as 2,2-dimethyl-1,3-propanediol; ethylene glycol; tetramethylene glycol; hexamethylene glycol; octamethylene glycol; and decamethylene glycol;

(2) alkene diols such as 1-propylene-1,2-diol; 2-propylene-1,2 diol; 1-butylene-1,2-diol; 3-butylene-1,2-diol; 1-hexylene-1,3-diol; 1-butylene-2,5-diol; and 2-butene-1,4-diol;

(3) cycloalkylenediols such as cyclopentylene-1,3-diol; cyclohexylene-1,2-diol; cyclohexylene-1,3-diol; and cyclohexylene-1,4-diol;

(4) alkane ether diols and diamido alkane diols such as di(β-hydroxyethyl) ether and HOCH$_2$C(=O)NH(CH$_2$)$_4$NH(O=)CCH$_2$OH;

(5) cyclohexane dimethanol; and (6) castor oil and diols and triols derived therefrom.

Examples of dihydroxy compounds suitable for conversion to the polyacetals and then to a polyurethane in accordance with this invention include ethylene glycol, diethylene glycol, propylene glycol, butylene gycol, or hexamethylene glycol and hydroxy-terminated polyesters obtained from the reaction of said compounds with a dicarboxylic acid such as succinic acid, adipic acid, and sebacic acid. The polyesters most suitable for purposes of this invention are those having a molecular weight from about 200 to about 2000.

In addition to the polyesters, polyethers such as polyethylene ether glycols, polyproplene ether glycols, other polyalkylene ether glycols and mixtures or copolymers thereof having molecular weights of from about 100 to about 6000 can be utilized as intermediates in the preparation of the polyacetals for conversion to polyurethanes for the purposes of this invention.

Copolymeric diols which also are suitable for conversion to polyacetals whose subsequent reaction with polyisocyanates forms insulated glass sealants in accordance with this invention may be made by the co-condensation of dithiodialkylene glycols with such dihydroxy compounds. The acid catalyzed reaction is taught by U.S. Pat. No. 2,582,605, which is incorporated herein by reference. A suitable diol for that purpose may be made, for example, by the co-condensation of an alkylene glycols having from 2 to 20 carbon atoms, e.g., ethylene glycol or propylene glycol, with dithiodiglycol. The molar ratio may vary over a wide range, depending on whether it is desired to have the polymer chain capped by a β-hydroxyalkyl sulfide group or by a hydroxyalkyl group.

It will be appreciated by those skilled in the art that mixtures of suitable polyhydroxy and/or polyisocyanate compounds can be used for purposes of this invention if desired.

The aliphatic diol may constitute up to about 50 percent of the total diol weight but, preferably, it is from about 1 to about 20 percent. Up to about 10% of an aliphatic triol, by weight of the total polyol mixture, may be used when a crosslinked polyacetal is desired. The triol is exemplified by 1,2,3-propanetriol; 1,3,5-tris(2-hydroxyethyl)cyanuric acid; trimethylol propane, and castor oil.

The improved sealant of this invention may be prepared by a one-step procedure wherein the hydroxyl terminated polysulfide polyacetal is reacted with a polyisocyanate at a ratio of from about 1:1 to about 1.2:1, preferably about 1.05:1, on an equivalents basis. The final stages of the reaction may take place after the partially cured sealant is in place in the window. Alternatively, the formation of the sealant may be undertaken in a two-step procedure wherein an isocyanate-terminated polysulfide polyacetal is formed first and then the stoichiometric requirement of additional hydroxy-terminated polysulfide polyacetal is mixed with the precursor.

A wide variety of polyisocyanates can be reacted suitably with the above-described hydroxyl terminated polysulfides to prepare the polysulfide-based polyurethanes that have found in this invention to be superior insulated glass sealants. Generally, any of the organic polyisocyanates that have been proposed previously for the preparation of polyurethane resins may be employed here. Suitable polyisocyanates are, for example, isophorone diisocyanate (abbreviated as IPDI); arylene polyisocyanates such as tolylene-, metaphenylene-, methylene-bis-(phenylene-4-) (abbreviated MDI and sold under the trademark RUBINATE 9310), biphenylene-4,4'-;3,3'-dimethoxybiphenylene-4,4'-;3,3'-biphenylene-4,4'-; and methylene-(tetramethylxylene-) (abbreviated as MTMXDI); alkylene polyisocyanates such as ethylene-, ethylidene-, propylene-1,2-, butylene-1,4-; butylene-1,3-; cyclohexylene-1,4-; methylene-bis (cyclohexyl-4,4')-; and hexamethylene-1,6-diisocyanate (abbreviated as HDI). Commercially available isocyanate-terminated prepolymers such as the MDI prepolymer sold under the trademark RUBINATE 1790 are also suitable as curing agents in this invention.

A suitable procedure for making the insulated glass sealants of this invention comprises making a sealant base first by mixing the hydroxyl-terminated copolymeric polysulfide polyacetal, a curing catalyst, a chain extender, a plasticizer, fillers, dehydrating agents, and thixotropic agents. The sealant base (Part A)is sold along with the curing agent (Part B)as a two part package to be combined shortly before placement around the perimeter of the U-shaped channel of a twin-paned window. The general procedure for making the sealant base comprises blending the polyacetal, chain extender and plasticizer in a vessel such as a ROSS, HOCKMEYER, or SHAR mixer using a sweep blade. The thixotropic agents, fillers, and dehydrating agents are then dispersed in the blend using a Cowles type blade and ground at high speed under full vacuum until a Hegman grind of less than 2 mils is achieved. Moisture is reduced to less than 600 ppm by azeotropic distillation with toluene. An adhesion promoter and additional thixotropic agents, if such are needed, are then blended in along with a catalyst to finish off the sealant base. To make Part B, one or more of the polyisocyanate curing agents is mixed under a nitrogen atmosphere with or without an adhesion promoter, pigment, and thixotropic agent.

The hydroxyl-terminated polysulfide polyacetals of this invention may be converted into readily curable isocyanate-terminated polysulfide polyacetals for use as prepolymers in this invention by the reaction of a polyisocyanate with said polysulfide using NCO:OH ratios above 1.2:1, preferably about 2:1 or higher.

They may be stored and shipped to desired locations safely. A fully cured sealant may be achieved by mixing the prepolymer with the stoichiometrically necessary amount of any polyol that is conventional in the prepolymer art and placing the mixture around the perimeter of the U-shaped channel between two glass panes. It is preferred, however, to use the hydroxyl terminated polysulfide as the polyol in the curing reaction.

The sealants of this invention contain from about 15% to about 30%, preferably from about 20 to about 25%, by weight of the polyurethane described herein.

A variety of catalysts, including tertiary amines, may be used to promote the cure of the polysulfide-based prepolymers to the corresponding polyurethanes but the preferred catalysts include the diorganotin carboxylates having from about 1 to 4 carbon atoms in the organotin moiety and from about 8 to about 12 carbon atoms in the carboxylate moiety, as exemplified by dibutyltin dilaurate. The catalysts may be used alone or in combination in amounts from about 0.0001% to about 0.1% by weight of the formulated reaction mixture. The rate of reaction may be slowed down, when desired, by the addition of from about 0.005 to about 0.1% by weight of a regulator such as oleic acid or the like. The molecular weight of the polysulfide-based polyurethane may be regulated by the addition of a chain stopper such as n-decyl mercaptan to Part A of the sealant package. Or, the strength may be enhanced by adding from 0.1 to 1% by weight of a short chain diol such as 1,4-butanediol as a chain extender.

The work time of the sealants made according to this invention varies from 10 to 90 minutes, depending largely upon the molecular weight of the hydroxyl terminated polysulfide, the temperature, and the type of catalyst or regulator, if any, used.

The sealants of this invention also contain from about 40 to about 60% by weight of fillers such as calcium carbonate, talc, mica, and platey clays. Said sealants may optionally also contain from about 0.12 to about 1% by weight of a glass adhesion promoter such as a silane exemplified by an aminopropyl-trimethoxysilane, mercaptopropyl trimethoxysilane, and glycidoxypropyl trimethoxysilane. From about 15 to about 30% of a plasticizer may also be present in the sealants of this invention. Examples of a plasticizer include the alkylbenzyl phthalates (e.g., alkyl is octyl) and chlorinated paraffins. Included among other optional components of the sealants of this invention are colorants, ultra-violet light stabilizers, and other rheology control agents.

The sealants of this invention have an MVT rate not greater than about 20, preferably not greater than about 15, grams/m$^2$/day as determined by ASTM F-1249.

The sealants of this invention form an excellent bond with glass, aluminum, and MYLAR films. Their tensile adhesion strength is at least about 60, preferably at least about 90 pounds per square inch, as determined by ASTM C-1135. They have an elongation of at least about 100%, preferably 200%, as determined by ASTM-D412.

The following examples illustrate the preparation of the hydroxy-terminated polysulfide polyacetal and the insulated glass sealant of this invention.

Preparation of a Polyol Base (Part A)

The copolymeric polysulfide polyacetal, plasticizers, adjuvant diol, fillers, and additives identified as items 1–7 in Table 1 and toluene were mixed in a Werner mixer at 1250 rpm under a vacuum system comprising a condenser filled with solid carbon dioxide to remove incidental moisture to a level less than 600 ppm. The silane adhesion promoters, tin catalyst, molecular sieves, silica, and other additives identified as items 8–11 in Table 1 were mixed into and made a part of the polyol base before it was sealed prior to curing. Weights are given in grams in Table 1. Abbreviations used are: DTDG for dithiodiglycol; HXDO for 1,6-hexanediol; TPG for tripropylene glycol; CHDM for 1,4-cyclohexane dimethanol; and THEC for 1,3,5-(trishydroxyethyl)cyanuric acid.

TABLE 1

| | | Example Number | | | |
|---|---|---|---|---|---|
| Item | Ingredient | 1 | 2 | 3 | 4 |
| 1 | DTDG polyformal copolymer (mole % co-monomer) | THEC (2) | TPG (20) | HXDO (20) | CHDM (20) |
| | Eq. Wt. of DTDG polyformal copolymer | 1607 | 1225 | 2304 | 1087 |
| | DTDG polyformal copolymer weight | 29.5 | 29.5 | 29.5 | 29.5 |
| 2 | OXY 54-120 chlorinated plasticizer; weight | 8.815 | 8.815 | 8.815 | 8.815 |
| 3 | SANTICIZER 261 phthalate plasticizer; weight | 8.815 | 8.815 | 8.815 | 8.815 |
| 4 | 1,4 butanediol; weight | 0.59 | 0.59 | 0.59 | 0.59 |
| 5 | HAKUENKA coated calcium carbonate; weight | 18.7 | 18.7 | 18.7 | 18.7 |

TABLE 1-continued

| | | Example Number | | | |
|---|---|---|---|---|---|
| Item | Ingredient | 1 | 2 | 3 | 4 |
| 6 | GS-255 calcium carbonate; weight | 30.59 | 30.59 | 30.59 | 30.59 |
| 7 | METHYLON 75-108; weight | 0.5 | 0.5 | 0.5 | 0.5 |
| 8 | Molecular Sieves (3A); weight | 1.53 | 1.53 | 1.53 | 1.53 |
| 9 | Silane A1170 (amino); weight | 0.75 | | | |
| 10 | T-12 (tin catalyst); weight | 0.005 | 0.005 | 0.005 | 0.005 |
| 11 | TS-720; weight | 0.3 | 0.3 | 0.3 | 0.3 |
| | Total weight | 100 | 99.3 | 99.3 | 99.3 |
| | Total equivalents | 0.033 | 0.04 | 0.0287 | 0.043 |

Preparation of Isocyanate Curative (Part B)

The isocyanates, silane, and pigment identified as items 1–3 in Table 2 were mixed to yield a curative having the number of NCO equivalents shown in Table 2. The ratio of NCO equivalents and OH equivalents used in making the sealants is also shown in Table 2. The isocyanates used are an MDI prepolymer (RUBINATE 1790) and MDI (RUBINATE 9310).

TABLE 2

| | | Example Number | | | |
|---|---|---|---|---|---|
| Item | Ingredient | 1 | 2 | 3 | 4 |
| 1 | Isocyanate Mix (Part B) | | | | |
| a. | Rubinate 9310 | 60 | 100 | 100 | 100 |
| b. | Rubinate 1790 | 40 | | | |
| 2 | A 187 | | 8 | 8 | 8 |
| 3 | Iron Oxide Pigment Paste | 2.5 | 2.5 | 2.5 | 2.5 |
| 4 | Total grams added/100 g base | 5.41 | 6.68 | 4.8 | 7.2 |
| 5 | NCO Equivalents | 0.034 | 0.042 | 0.03 | 0.045 |
| 6 | NCO/OH ratio | 1.0 | 1.05 | 1.05 | 1.05 |

The properties of the cured sealants and the processing properties during cure are given in Table 3. The moisture vapor transmission rate of an insulated glass sealant is measured by the ASTM F-1249-90 method.

TABLE 3

| Properties of | Example Number | | | |
|---|---|---|---|---|
| Cured Materials | 1 | 2 | 3 | 4 |
| Cure Time | 3 days | 7 days | 7 days | 7 days |
| Hardness (Shore A) | 60 | 48 | 50 | 59 |
| | (7 days) | (14 days) | (14 days) | (26 days) |
| Tensile (TA)-psi | 98.2 | 93 | 92 | 84 |
| Modulus (psi) at: | | | | |
| 5% | 10 | 20 | 15 | 21 |
| 10% | 22.1 | 40 | 30 | 42 |
| 20% | 40.9 | 74 | 54 | 74 |
| 40% | 68.7 | | 88 | |
| 60% | 89.6 | | | |
| 100% | | | | |
| Elongation (%) | 147.4 | 56 | 89 | 50 |
| | | 14 day | 14 day | 26 day |
| Tensile (T&E) (psi) | | 216 | 223 | 294 |

TABLE 3-continued

| Properties of Cured Materials | Example Number | | | |
|---|---|---|---|---|
| | 1 | 2 | 3 | 4 |
| Modulus (psi) at: | | | | |
| 100% | | 160 | 174 | 262 |
| 200% | | 183 | 202 | 276 |
| Elongation (%) | | 358 | 417 | 258 |
| Tear Strength | | 41 | 50 | 55 |
| MVT | | 16.5 | 15.7 | 9.05 |
| Compression Set (% set) | | 80 | 78 | 78 |
| Processing Properties | | | | |
| Base Semco Viscosity (sec) | >30 min | 91 | 254 | 104 |
| Base Slump (in) | 0.01 | .04 | | >0.1 |
| Base Density (lbs/gal) | | 12.9 | 13.42 | 12.9 |
| Work Life (stick) (min) | 15 | 20 | 22 | 25 |
| Tack Free (min) | <45 | 50 | 50 | 50 |
| Processing of Cured Materials | | | | |
| Adhesion: | | | | |
| Glass | coh | thick film | thin film | thin film |
| MYLAR film | | coh | coh | coh |
| PVC Spacer | | adh | adh | adh |
| Aluminized MYLAR | | coh | coh | coh |

Coh = cohesive failure, adh = adhesive failure

What is claimed is:

1. A method for sealing an insulated glass window which comprises filling a U-shaped channel around the perimeter of the window and between two panes of glass with a mixture comprising a randomly copolymeric hydroxil terminated polysulfide polyacetal of a dithiodialkylene glycol and an aliphatic diol, and, optionally, an aliphatic triol as a partial replacement of the diol, said polyacetol having a number average molecular weight of from about 500 to about 10,000, a catalyst, and a polyisocyanate at an NCO/OH ratio of from about 1:1 to about 1.2:1, and curing said mixture to form a polysulfide-based polyurethane sealant.

2. The method of claim 1 wherein the molecular weight of the polyacetal is from about 500 to about 6000.

3. The method of claim 1 wherein the NCO/OH ratio is about 1.05:1.

4. An insulated glass sealant comprising a polysulfide-based polyurethane prepared by reacting a randomly copolymeric hydroxyl-terminated polysulfide polyacetal of a dithiodialkylene glycol and an aliphatic diol, and, optionally, an aliphatic triol as a partial replacement of the diol, with a polyisocyanate at an NCO/OH ratio of from about 1:1 to about 1.2:1 and a catalyst.

5. The sealant of claim 4 wherein the NCO/OH ratio is about 1.05:1.

6. The sealant of claim 4 characterized further by the presence of a plasticizer and a glass adhesion promoting silane.

7. The sealant of claim 4 wherein the number average molecular weight of the polyacetal is from about 500 to about 10,000.

8. The sealant of claim 4 wherein the number average molecular weight of the polyacetal is from about 1500 to about 4500.

* * * * *